United States Patent
Lee et al.

(10) Patent No.: US 8,081,627 B2
(45) Date of Patent: Dec. 20, 2011

(54) SYSTEM AND METHOD FOR WIRELESSLY CONNECTING DIVERSE AD-HOC NETWORK GROUPS

(75) Inventors: Ta-Yung Lee, Hsinchu (TW); Chih-Wen Cheng, Hsinchu (TW); Cheng-Hsien Yang, Hsinchu (TW); Chia-Chuan Wu, Hsinchu (TW)

(73) Assignee: Mitac Technology Corp., Hsinchu (TW)

( * ) Notice: Subject to any disclaimer, the term of this patent is extended or adjusted under 35 U.S.C. 154(b) by 273 days.

(21) Appl. No.: 12/257,932

(22) Filed: Oct. 24, 2008

(65) Prior Publication Data
US 2010/0103841 A1   Apr. 29, 2010

(51) Int. Cl.
*H04J 1/16*  (2006.01)
*H04L 12/28*  (2006.01)
*H04W 4/00*  (2009.01)
*H04W 36/00*  (2009.01)

(52) U.S. Cl. ........ 370/389; 370/241; 370/254; 370/338; 455/442

(58) Field of Classification Search .......... 370/252–254, 370/311–328, 338–341; 455/569–575, 442–550; 709/217–220, 223–244
See application file for complete search history.

(56) References Cited

U.S. PATENT DOCUMENTS

| | | | |
|---|---|---|---|
| 6,842,460 B1* | 1/2005 | Olkkonen et al. | 370/465 |
| 7,260,362 B2* | 8/2007 | Teibel | 455/69 |
| 7,502,407 B2* | 3/2009 | Sakata et al. | 375/211 |
| 7,899,017 B2* | 3/2011 | Yu et al. | 370/338 |
| 2004/0147223 A1* | 7/2004 | Cho | 455/41.2 |
| 2006/0133613 A1* | 6/2006 | Ando et al. | 380/270 |
| 2006/0215576 A1* | 9/2006 | Yu et al. | 370/252 |
| 2007/0165532 A1* | 7/2007 | Retana et al. | 370/241 |
| 2009/0022130 A1* | 1/2009 | Yu et al. | 370/338 |
| 2009/0046598 A1* | 2/2009 | Krishnaswamy et al. | 370/254 |
| 2009/0232048 A1* | 9/2009 | Lynch et al. | 370/328 |
| 2010/0020745 A1* | 1/2010 | Agulnik et al. | 370/328 |

* cited by examiner

*Primary Examiner* — M. Phan
(74) *Attorney, Agent, or Firm* — Apex Juris, pllc; Tracy M. Heims

(57) ABSTRACT

A wireless connection system and method are provided to connect diverse Ad-hoc network groups. A first Ad-hoc network group has a first network node and a first edge node wirelessly connecting with each other. The second Ad-hoc network group has a second network node and a second edge node wirelessly connecting with each other without connecting the first Ad-hoc network group. The first and second edge nodes have multiple wireless modules respectively. One of the wireless modules is used to connect wireless with other network nodes in the same Ad-hoc network group. The rest extra wireless module(s) is used to connect wirelessly with another extra wireless module(s) of the edge node(s) in different Ad-hoc network group(s). Therefore, the independent first and second Ad-hoc network groups are now capable of wirelessly connecting with each other.

8 Claims, 5 Drawing Sheets

SYSTEM AND METHOD FOR WIRELESSLY CONNECTING DIVERSE AD-HOC NETWORK GROUPS

BACKGROUND OF THE INVENTION

1. Field of the Invention

The present invention relates to wireless connection technologies between diverse network groups, and more particularly, to a method and system for wirelessly connecting diverse Ad-hoc network groups.

2. Related Art

In the conventional Ad-Hoc technology, every node of a network group may, by using a dedicated wireless network card respectively, connect with each other so as to form the Ad-Hoc network group. However, every Ad-Hoc network group is independent from each other and diverse Ad-Hoc network groups can not connect with each other. Therefore, how to resolve the connection problems between diverse network groups under Ad-hoc architecture has become an issue needed to be resolved.

SUMMARY OF THE INVENTION

To solve the aforesaid problems of the prior art, the present invention provides a method and system for wirelessly connecting diverse Ad-hoc network groups. Through the present invention, diverse Ad-hoc network groups that are independent from each other may now achieve wireless connections and share network resources in-between.

In an embodiment of the present invention, a wireless connection system includes one or more first network node, first edge node, second network node and second edge node. Each of the first network node and the first edge node has a first wireless module respectively. Through the first wireless module, the first network node and the first edge node are capable of wirelessly connecting with each other, so as to operate as a first Ad-hoc network group. Each of the second network node and the second edge node has a second wireless module respectively. Through the second wireless module, the second network node and the second edge node are capable of wirelessly connecting with each other, so as to operate as a second Ad-hoc network group without wirelessly connecting the first Ad-hoc network group through the second wireless modules. The first edge node has a first extra wireless module and the second edge node has a second extra wireless module. The first edge node and the second edge node are capable of wirelessly connecting with each other through the two first/second extra wireless module, thereby facilitate the first Ad-hoc network group and the second Ad-hoc network group a wireless connection through the first edge node and second edge node.

In an embodiment of the present invention, a wireless connection method includes the following steps. First of all, enable one or more first network node, first edge node, second network node and second edge node. Next, through a first wireless module configured in each of the first network node and first edge node, the first edge node and first network node wirelessly connects with each other to form a first Ad-hoc network group, and through a second wireless module configured in each of the second network node and second edge node, the second edge node and the second network node wirelessly connects with each other to form a second Ad-hoc network group without wirelessly connecting the first Ad-hoc network group through the second wireless modules. Afterwards, provide a first extra wireless module equipped in the first edge node and provide a second extra wireless module equipped in the second edge node. Eventually, through the first and second extra wireless modules, wirelessly connect the first edge node and the second edge node, so that the first Ad-hoc network group and the second Ad-hoc network group are capable of wirelessly connecting with each other.

These and other features, aspects, and advantages of the present invention will become better understood with reference to the following description and appended claims. It is to be understood that both the foregoing general description and the following detailed description are examples, and are intended to provide further explanation of the invention as claimed.

BRIEF DESCRIPTION OF THE DRAWINGS

The present invention will become more fully understood from the detailed description given herein below for illustration only, and thus is not limitative of the present invention, and wherein.

DETAILED DESCRIPTION OF THE INVENTION

Figure 1:
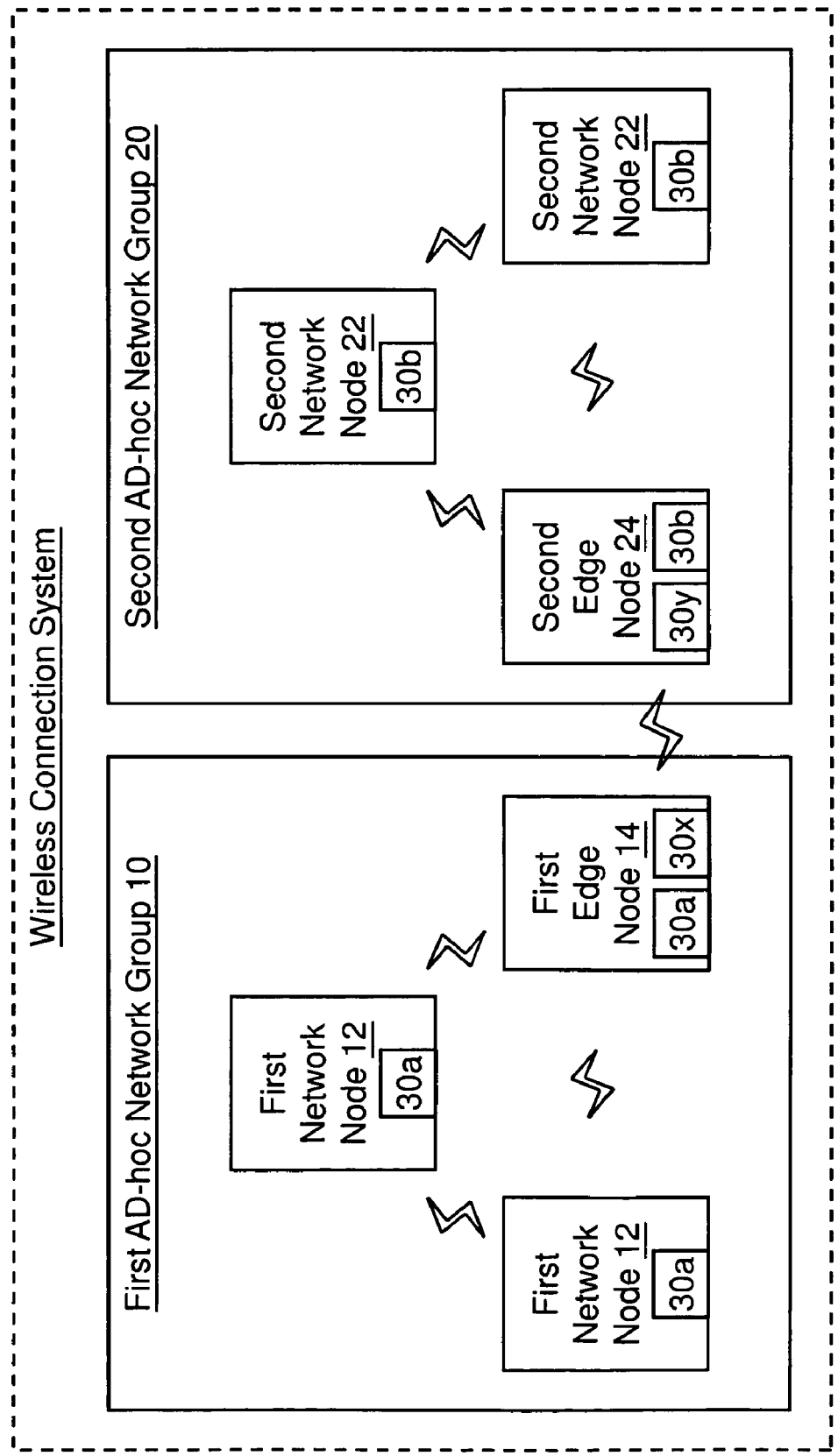
FIG. 1 is a first schematic view illustrating a system for wirelessly connecting diverse Ad-hoc network groups according to a first embodiment of the present invention.

Reference will now be made in detail to the present preferred embodiments of the invention, examples of which are illustrated in the accompanying drawings. Wherever possible, the same reference numbers are used in the drawings and the description refers to the same or the like parts.

Figure 2:
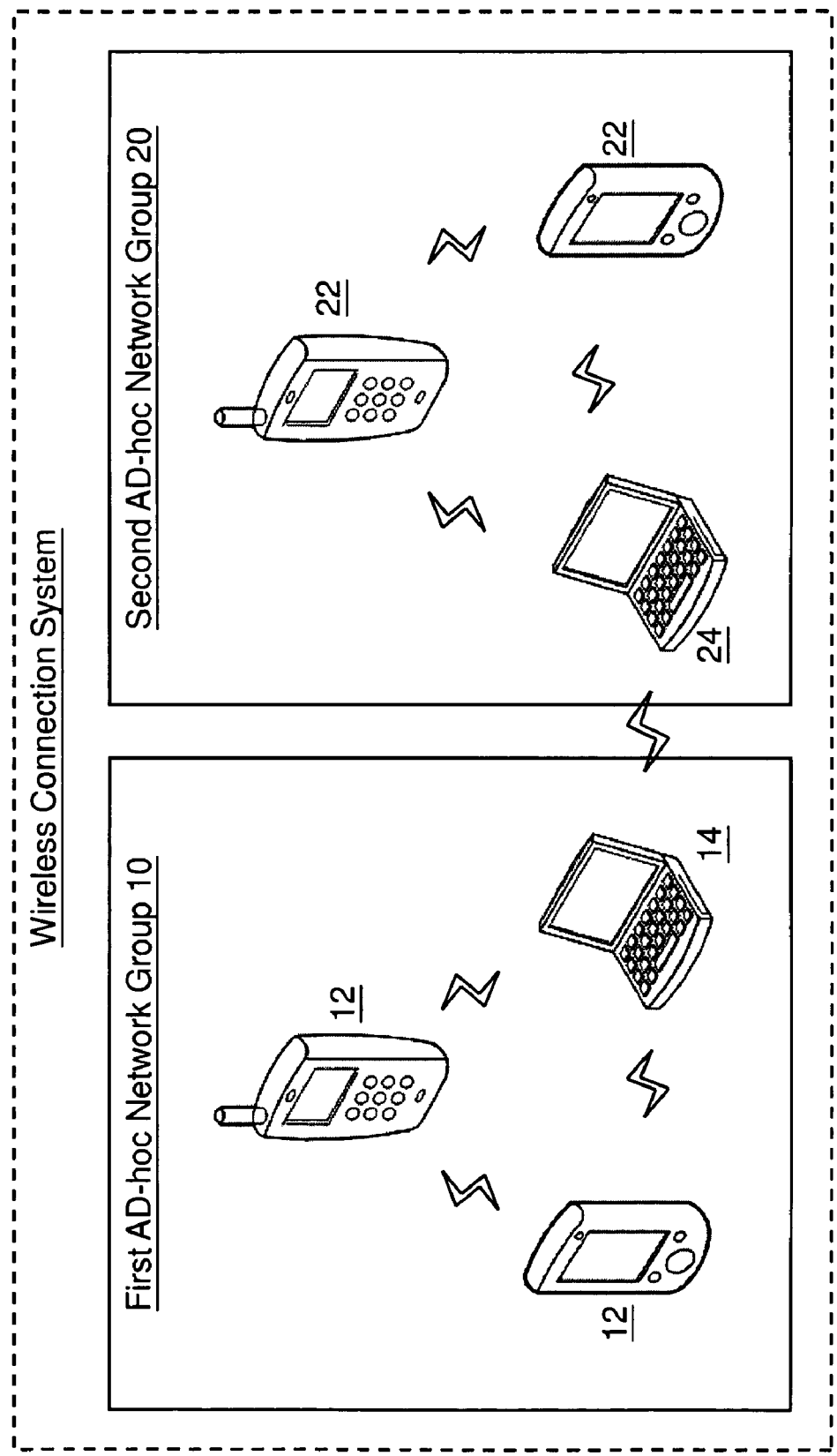
FIG. 2 is a second schematic view illustrating the system for wirelessly connecting diverse Ad-hoc network groups according to the first embodiment of the present invention.

Please refer to both FIG. 1 and FIG. 2, which are first and second schematic view illustrating a system for wirelessly connecting diverse Ad-hoc network groups according to a first embodiment of the present invention. The wireless connection system includes a first Ad-hoc network group 10 with multiple (two) first network nodes 12 and a first edge node 14, and a second Ad-hoc network group 20 with multiple (two) second network nodes 22 and a second edge node 24. A first wireless module 30a is equipped in each of the first network nodes 12 and first edge node 14. A second wireless module 30b is equipped in each of second network nodes 22 and second edge node 24.

As shown in the drawings, the first Ad-hoc network group 10 includes multiple first network nodes 12 and at least one first edge node 14, while the second Ad-hoc network group 20 includes multiple second network nodes 22 and at least on second edge node 24.

Each of the first network nodes 12 has a first wireless module 30a equipped therein. Through the wireless modules 30a the first network nodes 12 are capable of wirelessly connecting with each other. The first edge node 14 has two wireless modules, the first wireless module 30a and a first extra wireless module 30x. One of the two wireless modules in the first edge node 14, here the first wireless module 30a is used to wirelessly connect the two first network nodes 12, so that the first network nodes 12 and the first edge node 14 may connect wirelessly with each other to form and operates as the first Ad-hoc network group 10.

Similarly, each of the second network nodes 22 has a second wireless module 30*b*. The second network nodes 22 wirelessly connect with each other through the second wireless modules 30*b*. The second edge node 24 includes at least two wireless modules, the second wireless module 30*b* and a second extra wireless module 30*y*. Through one of the two wireless modules in the second edge node 24, here the second wireless module 30*b* is used to wirelessly connect the two second network nodes 22, so that the second network nodes 22 and the second edge node 24 may connect wirelessly with each other to form and operates as the second Ad-hoc network group 20. However, the first and second Ad-hoc network groups 10, 20 are independent network groups without wirelessly connecting each other through the first and second wireless modules 30*a*, 30*b*.

The aforesaid first edge node 14, the second edge node 24, the first network node 12 and the second network node 22 are similar electronic devices equipped with wireless transmission functions. The major features of the first edge node 14 and the second edge node 24 are: each of the first edge node 14 and the second edge node 24 has another extra wireless module respectively configured therein (namely the first extra wireless module 30*x* and the second extra wireless module 30*y*); the first edge node 14 and the second edge node 24 respectively uses one of their two wireless modules (namely the wireless modules 30*a*, 30*b*) to wirelessly connect the first network nodes 12 or the second network nodes 22, so as to form the first Ad-hoc network group 10 and the second Ad-hoc network group 20 respectively (yet no wireless connection between the first and second network groups 10, 20); the first extra wireless module 30*x* of the first edge node 14 wirelessly connects the second extra wireless module 30*y* of the second edge node 24, so that the first Ad-hoc network group 10 can wireless connect through the first edge node 14 and the second edge node 24 to the second Ad-hoc network group 20. Therefore, the first Ad-hoc network group 10 and the second Ad-hoc network group 20 that are used to be independent from each other, may now wirelessly connect with each other through the first edge node 14 and the second edge node 24 respectively.

More wireless modules may be further configured on the first edge node 14 and the second edge node 24 so as to wirelessly connect with more different network groups under Ad-hoc architecture. Moreover, if more edge nodes are provided in the same network group, such network group may also connect wirelessly with more different network groups. In conventional Ad-hoc architecture, only the nodes within the same Ad-hoc network group are possible to connect with each other and share resources. Through the wireless connection system of the present invention, multiple diverse Ad-hoc network groups that are independent from each other may now be wirelessly connected together. That means network-accessible resources separated in diverse independent Ad-hoc network groups will be able to share with users from different Ad-hoc network groups for multiple access operations.

In the present invention, the wireless communication protocol used by the wireless modules may include various wireless communication protocols such as Wi-Fi®, Bluetooth®, GPRS (General Packet Radio Service), WAVE (Wireless Access in the Vehicular Environment) and etc. The aforesaid network nodes and edge nodes may be realized by mobile phones, notebook computers, PDA (Personal Digital Assistant) or various types of electronic devices with wireless communication functions equipped thereon.

Figure 3:
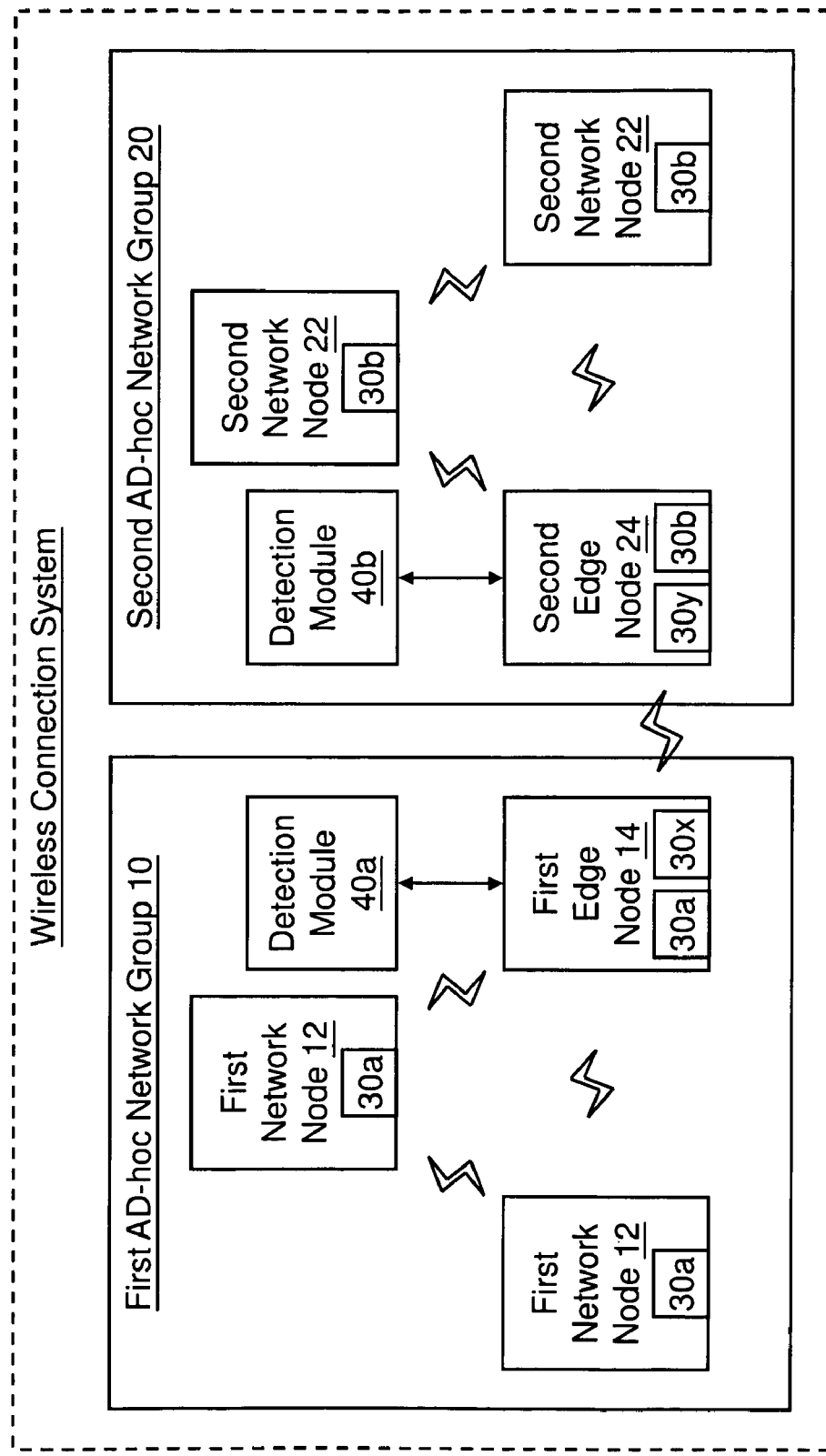
FIG. 3 is a schematic view illustrating a system for wirelessly connecting diverse Ad-hoc network groups according to a second embodiment of the present invention.

Please refer to FIG. 3, which is a schematic view illustrating a system for wirelessly connecting diverse Ad-hoc network groups according to a second embodiment of the present invention. In the second embodiment, the first/second Ad-hoc network group further includes a detection module 40*a/b*. Here the detection modules 40*a* and 40*b* may respectively configured in the first Ad-hoc network group 10 and the second Ad-hoc network group 20, and be electrically connected with the first edge node 14 and second edge node 24. Such connections are only included but not limited in the present invention. The detection module 40*a* is used to detect if the second Ad-hoc network group 20 is in the linkage range of the first Ad-hoc network group 10; likewise, the detection module 40*b* is used to detect if the first Ad-hoc network group 10 is in the linkage range of the second Ad-hoc network group 20. Now since only the first edge node 14 and the second edge node 24 have the first and second extra wireless modules 30*x* and 30*y* available for wireless connection, it is actually the first edge node 14 and the second edge node 24 that use the detection module 40*a/b* to detect if the other edge node is in the own linkage arrange. The linkage range of the detection module 40*a*/40*b* depends on the wireless technology used. In actual implementations, the detection module 40*a*/40*b* may imbedded on the first/second edge node 14/24 to directly detect if outside its own Ad-hoc network group, any other wireless module is available and linkable in the linkage ranges of each other. Certainly, the first and second extra wireless modules 30*x* and 30*y* need to use the same wireless communication protocol to reach each other. Namely, from time to time the first/second edge node will be able to dynamically detect if there is any other Ad-hoc network group in the neighborhood. If any other wireless network group is detected, the linkage distance between the two Ad-hoc network groups (namely between the first and second edge nodes; or more precisely, between the first and second extra wireless modules 30*x*, 30*y*) will be further detected. When the signal intensity between the two Ad-hoc network groups is stronger enough to reach a standard intensity (namely the two groups locate in the linkage range), the two Ad-hoc network groups may be wirelessly connected. To be simple, when the edge node detects and find another network groups are existing in the neighborhood, with the in-between distance fulfilling the linkage range for the two network groups, certain wireless connection operations will be further performed automatically, such as message exchange (through wireless message packets) under the same wireless communication protocol for identifying each other and building up linkage protocols. When the two extra wireless modules are connected, the two edge nodes will be linked as well. Aside from the wireless connections between the first and second extra wireless modules 30*x*, 30*y* (namely between the first and second edge nodes 14, 24), the first and second network nodes 12, 22 in each of the first and second Ad-hoc network groups 10. 20 will be able to further connect with each other second and first network nodes 22, 12 under Ad-hoc architecture, thereby forming a bigger Ad-hoc network group. Therefore, when the second Ad-hoc network group 20 is located in the linkage range of the first Ad-hoc network group 10, the first edge node 14 of the first Ad-hoc network group 10 will wirelessly connect the second edge node 24 of the second Ad-hoc network group 20.

Besides, in any node of the first Ad-hoc network group 10 and the second Ad-hoc network group 20, at least one first/second network information sheet may be respectively stored therein; or, the first/second network information sheet may only be stored in the first edge node 14 and the second edge node 24 respectively. Each of the first and second network information sheets respectively records dedicated first network information and second network information within the first Ad-hoc network group 10 and the second Ad-hoc network group 20. When the first edge node 14 wirelessly connects the first Ad-hoc network group 10 and the second Ad-hoc network group 20 together through the second edge node 24, forming a bigger Ad-hoc network group, the network information from the opposite side needs to be added and updated. The network information may include the amount of the nodes included in the Ad-hoc network group, the linkage statuses between each node, shared resources within the same Ad-hoc network group.

Figure 4:
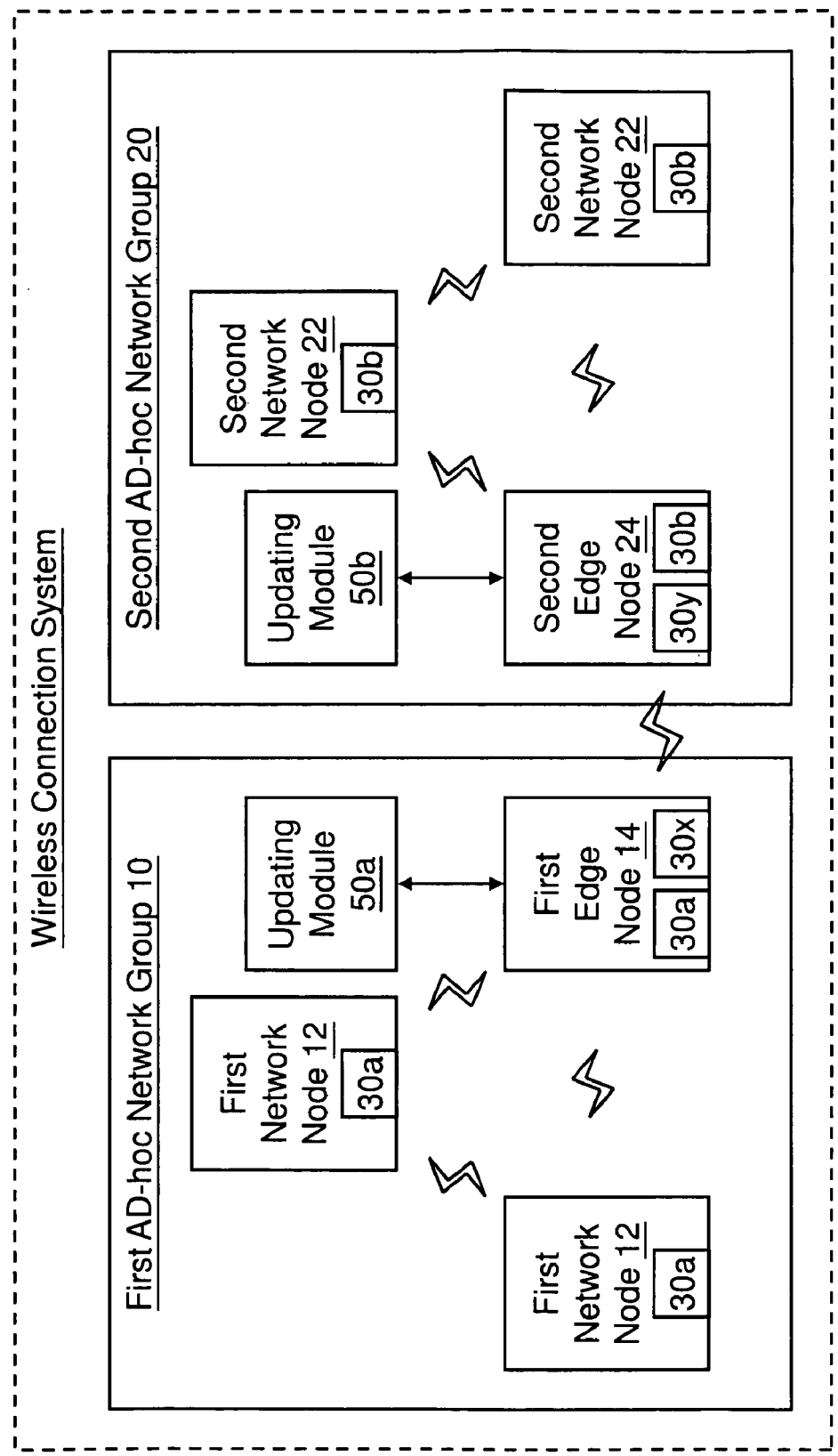
FIG. 4 is a schematic view illustrating a system for wirelessly connecting diverse Ad-hoc network groups according to a third embodiment of the present invention.

Please refer to FIG. 4, which is a schematic view illustrating a system for wirelessly connecting diverse Ad-hoc network groups according to a third embodiment of the present invention. In the third embodiment, update modules 50a, 50b are further disclosed. The update modules 50a, 50b may optionally be configured/embedded in the first edge node 14 and the second edge node 24 respectively, or be electrically connected with first edge node 14 and the second edge node 24 respectively. In fact, it is possible to equip a dedicated update module in each of the first network nodes 12, the second network nodes 22, the first edge node 14 and the second edge node 24. In actual implementation, the update module 50a/50b may be realized by a wireless communication controller embedded in each of the wireless modules.

When the first Ad-hoc network group 10 wirelessly connects the second Ad-hoc network group 20 through the first edge node 14 and the second edge node 24, the first/second network information sheet needs to be combined and modified since the first Ad-hoc network group 10 and the second Ad-hoc network group 20 have expanded to a bigger network group. Therefore, the update modules 50a, 50b will update the first/second network information recorded in the first/second network information sheet (from the separated first and second network information to combined, reorganized, larger "joint network information"). Furthermore, the two connected Ad-hoc network groups will follow the settings recorded in the updated, expanded joint network information sheet to transmit/receive and filter network information/messages. Such joint network information sheet of the two wireless-connected Ad-hoc network groups, with joint network information of the two wireless-connected Ad-hoc network groups recorded therein, may be stored in the first/second Ad-hoc groups, the first/second network nodes, and/or the first/second edge nodes. Upon wireless connection of the first and second Ad-hoc network groups 10, 20, the update module updates first network information sheet of the first Ad-hoc network group 10 and second network information sheet of the second Ad-hoc network group into the joint network information sheet with the joint network information.

Figure 5:
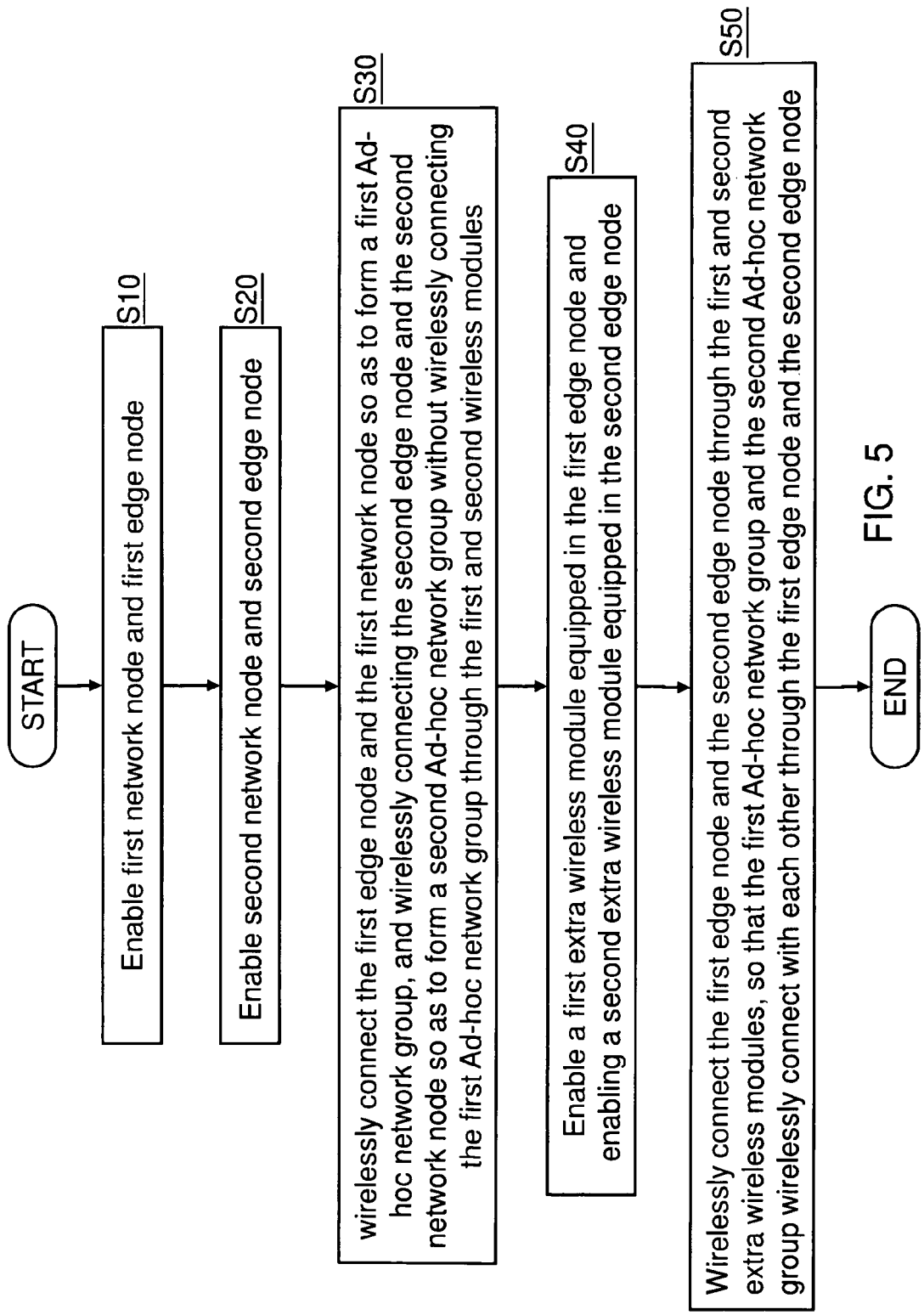
FIG. 5 is a flow chart illustrating a method for wirelessly connecting diverse Ad-hoc network groups according the present invention.

Please refer to FIG. 5, which is a flow chart illustrating a method for wirelessly connecting diverse Ad-hoc network groups according the present invention. The wireless connection method of the present invention includes the following steps.

Step S10: Enable at least one first network node and at least one first edge node.

Step S20: Enable at least one second network node and at least one second edge node.

Step S30: Through at least one first wireless module equipped in each of the first network node and the first edge node, wirelessly connecting the first edge node and the first network node so as to form a first Ad-hoc network group; and through at least one second wireless module equipped in each of the second network node and the second edge node, wirelessly connecting the second edge node and the second network node so as to form a second Ad-hoc network group without wirelessly connecting the first Ad-hoc network group through the first and second wireless modules.

Step S40: Enable a first extra wireless module equipped in the first edge node and enabling a second extra wireless module equipped in the second edge node.

Step S50: Wirelessly connect the first edge node and the second edge node through the first and second extra wireless modules, so that the first Ad-hoc network group and the second Ad-hoc network group wirelessly connect with each other through the first edge node and the second edge node.

The above Step S40 further includes the following step: Detect if the first and second extra wireless modules are located in a linkage range of each other. When the second Ad-hoc network group is located in a linkage range of the first Ad-hoc network group, wirelessly connect first Ad-hoc network group and the second Ad-hoc network group.

Record joint network information respectively in the first network information sheet of the first Ad-hoc network group (to update the first network information sheet into a joint network information sheet) and in the second network information sheet of the second Ad-hoc network group (to update the second network information sheet into a joint network information sheet). To be simple, record network information of each of the first Ad-hoc network group and the second Ad-hoc network group into a joint network information sheet. Upon or after wireless connection of the first Ad-hoc network group and the second Ad-hoc network group, update network information (of all the nodes within the first Ad-hoc network group and the second Ad-hoc network group) listed in the joint network information sheet.

Furthermore, based on the wireless connection system of the present invention disclosed above and illustrated in FIG. 1~FIG. 4, the wireless connection method according to the present invention at least includes the following steps. First of all, enable one or more first network node, one or more first edge node, one or more second network node and one or more second edge node. Next, through one or more first wireless module equipped in each of the first network node and the first edge node, wirelessly connect the first edge node and the first network node so as to form a first Ad-hoc network group; and through one or more second wireless module equipped in each of the second network node and the second edge node, wirelessly connect the second edge node and the second network node so as to form a second Ad-hoc network group without wirelessly connecting the first Ad-hoc network group through the first and second wireless modules. Enable a first extra wireless module equipped in the first edge node and enable a second extra wireless module equipped in the second edge node. Afterwards, wirelessly connect the first edge node and the second edge node through the first and second extra wireless modules, so that the first Ad-hoc network group and the second Ad-hoc network group wirelessly connect with each other through the first edge node and the second edge node.

In the step of wirelessly connecting the first and second extra wireless modules further comprises some other steps: detecting if the first and second extra wireless modules are located in a linkage range of each other; certainly, joint network information of the first Ad-hoc network group and the second Ad-hoc network group may be respectively recorded in a joint network information sheet. Upon the beginning of the wireless connection of the two Ad-hoc network groups, the dedicated network information of the first edge node and the second edge node may only be respectively recorded in a joint network information sheet of the first edge node and the second edge node. Such joint network information sheet may only be stored in the first edge node and second edge node, or be respectively stored in the first network node, the first edge node, the second network node and the second edge node.

Additional advantages and modifications will readily occur to those proficient in the relevant fields. The invention in its broader aspects is therefore not limited to the specific details and representative embodiments shown and described herein. Accordingly, various modifications may be made without departing from the spirit or scope of the general inventive concept as defined by the appended claims and their equivalents.

What is claimed is:

1. A wireless connection system, comprising:
    at least one first network node and at least one first edge node each having a first wireless module equipped therein, each of the first network node and the first edge node wirelessly connecting with each other through the first wireless modules so as to form a first Ad-hoc network group;
    at least one second network node and at least one second edge node each having a second wireless module, each of the second network node and the second edge node wirelessly connecting with each other through the second wireless modules so as to form a second Ad-hoc network group without wirelessly connecting with the first Ad-hoc network group through the first and second wireless modules;
    wherein the first edge node has a first extra wireless module and the second edge node has a second extra wireless module, the first edge node and the second edge node connecting with each other through the first and second extra wireless modules so that the first Ad-hoc network group and the second Ad-hoc network group wirelessly connect with each other through the first edge node and the second edge node; and
    at least one joint network information sheet, recording joint network information of the wireless-connected first and second Ad-hoc network groups and being stored in the first Ad-hoc network group or the second Ad-hoc network group.

2. The wireless connection system of claim 1, wherein the joint network information sheet is respectively stored in each of the first network node, the first edge node, the second network node and the second edge node.

3. The wireless connection system of claim 1, wherein the joint network information sheet is respectively stored in each of the first edge node and the second edge node.

4. The wireless connection system of claim 1 further comprising an update module, upon wireless connection of the first and second Ad-hoc network groups, the update module updating first network information sheet of the first Ad-hoc network group and second network information sheet of the second Ad-hoc network group into the joint network information sheet with the joint network information.

5. A wireless connection method, comprising the steps of:
    enabling at least one first network node, at least one first edge node, at least one second network node and at least one second edge node;
    through at least one first wireless module equipped in each of the first network node and the first edge node, wirelessly connecting the first edge node and the first network node so as to form a first Ad-hoc network group, and through at least one second wireless module equipped in each of the second network node and the second edge node, wirelessly connecting the second edge node and the second network node so as to form a second Ad-hoc network group without wirelessly connecting the first Ad-hoc network group through the first and second wireless modules;
    enabling a first extra wireless module equipped in the first edge node and enabling a second extra wireless module equipped in the second edge node;
    wirelessly connecting the first edge node and the second edge node through the first and second extra wireless modules, so that the first Ad-hoc network group and the second Ad-hoc network group wirelessly connect with each other through the first edge node and the second edge node; and
    respectively recording network information of each of the first edge node and the second edge node into a joint network information sheet of the first edge node and/or the second edge node.

6. The wireless connection method of claim 5, wherein the joint network information sheet is stored respectively in each of the first network node, the first edge node, the second network node and the second edge node.

7. The wireless connection method of claim 5, wherein the joint network information sheet is respectively stored in each of the first edge node and the second edge node.

8. The wireless connection method of claim 5 further comprising a step of:
    updating the joint network information recorded in the network information sheet after the first Ad-hoc network group and the second Ad-hoc network group being wirelessly connected.

* * * * *